US012305321B2

(12) United States Patent
Liu et al.

(10) Patent No.: US 12,305,321 B2
(45) Date of Patent: May 20, 2025

(54) INTEGRATED WASHER-DRYER

(71) Applicants: CHONGQING HAIER ROLLER WASHING MACHINE CO., LTD., Chongqing (CN); HAIER SMART HOME CO., LTD., Shandong (CN)

(72) Inventors: Kai Liu, Shandong (CN); Yongshun Hou, Shandong (CN); Fangzheng Zhou, Shandong (CN)

(73) Assignees: CHONGQING HAIER ROLLER WASHING MACHINE CO., LTD. (CN); HAIER SMART HOME CO., LTD. (CN)

( * ) Notice: Subject to any disclaimer, the term of this patent is extended or adjusted under 35 U.S.C. 154(b) by 338 days.

(21) Appl. No.: 18/156,236

(22) Filed: Jan. 18, 2023

(65) Prior Publication Data

US 2023/0220606 A1 Jul. 13, 2023

Related U.S. Application Data

(63) Continuation of application No. PCT/CN2021/101623, filed on Jun. 22, 2021.

(30) Foreign Application Priority Data

Jul. 31, 2020 (CN) .......................... 202010756683.9

(51) Int. Cl.
*D06F 58/22* (2006.01)
*B01D 39/10* (2006.01)
(Continued)

(52) U.S. Cl.
CPC ............ *D06F 58/22* (2013.01); *B01D 39/10* (2013.01); *B01D 39/1669* (2013.01);
(Continued)

(58) Field of Classification Search
CPC ....................................................... D06F 58/22
See application file for complete search history.

(56) References Cited

FOREIGN PATENT DOCUMENTS

CN 102251368 A 11/2011
CN 203113121 U 8/2013
(Continued)

OTHER PUBLICATIONS

International Search Report for PCT Application No. PCT/CN2021/101623. Completion date Aug. 31, 2021.
(Continued)

*Primary Examiner* — Jason Y Ko
(74) *Attorney, Agent, or Firm* — Quarles & Brady LLP

(57) ABSTRACT

The present application relates to an integrated washer-dryer, including a box body, an inner and outer drum assembly installed in the box body, a drying air duct provided between the box body and the inner and outer drum assembly, and a heat exchange device provided in the drying air duct. An air inlet and an air outlet of the drying air duct are both in communication with the inner and outer drum assembly, the air inlet is configured with a first filter member, and a second filter member is provided between the first filter member and the heat exchange device. A water spray nozzle is provided within the drying air duct, and the water spray nozzle is provided between the first filter member and the second filter member, and is used for washing off debris trapped on the first filter member.

20 Claims, 5 Drawing Sheets

(51) Int. Cl.
    *B01D 39/16*     (2006.01)
    *B01D 46/00*     (2022.01)
    *B01D 46/12*     (2022.01)
    *B01D 46/42*     (2006.01)
    *B01D 46/62*     (2022.01)
    *B01D 46/69*     (2022.01)
    *D06F 25/00*     (2006.01)

(52) U.S. Cl.
    CPC ..... *B01D 39/1692* (2013.01); *B01D 46/0006* (2013.01); *B01D 46/12* (2013.01); *B01D 46/4227* (2013.01); *B01D 46/62* (2022.01); *B01D 46/69* (2022.01); *D06F 25/00* (2013.01); *B01D 2239/0478* (2013.01); *B01D 2239/065* (2013.01); *B01D 2239/1291* (2013.01); *B01D 2271/02* (2013.01); *B01D 2279/55* (2013.01)

(56) References Cited

FOREIGN PATENT DOCUMENTS

| | | |
|---|---|---|
| CN | 103898726 A | 7/2014 |
| CN | 105088703 A | 11/2015 |
| CN | 205501683 U | 8/2016 |
| CN | 106592183 A | 4/2017 |
| CN | 206173701 U | 5/2017 |
| CN | 207210751 U | 4/2018 |
| CN | 109554901 A | 4/2019 |
| CN | 109750471 A | 5/2019 |
| CN | 109898309 A | 6/2019 |
| CN | 109989241 A | 7/2019 |
| CN | 110886075 A | 3/2020 |
| CN | 210420648 U | 4/2020 |
| CN | 210886686 U | 6/2020 |
| EP | 1655401 A1 | 7/2005 |
| EP | 3366829 A1 | 8/2018 |
| JP | 2006136449 A | 6/2006 |
| KR | 20060040352 A | 5/2006 |
| WO | 2017206227 A1 | 12/2017 |
| WO | 2018162081 A1 | 9/2018 |

OTHER PUBLICATIONS

Extended European Search Report, European Patent Application No. 21849104.1, Apr. 18, 2024.
Jul. 20, 2023—Corresponding Chinese Notice of Allowance; CN Application number or patent No. 202010756683.9 Issue No. 2023072000269900; Applicant or patentee: Qingdao Haier Drum Washing Machine Co., Ltd. Haier Zhijia Co., Ltd. Name of invention: washing and drying machine.
Chinese Office Action dated Jan. 12, 2023. English Language. Application No. 202010756683.9.

INTEGRATED WASHER-DRYER

CROSS-REFERENCE TO RELATED APPLICATION

The present application is a continuation of International Application No. PCT/CN2021/101623, filed on Jun. 22, 2021, which claims priority to Chinese Patent Application No. 202010756683.9, filed with China National Intellectual Property Administration on Jul. 31, 2020 and entitled "Integrated Washer-Dryer", both of which are hereby incorporated by reference in their entireties.

TECHNICAL FIELD

The present application relates to the technical field of household appliances, and in particular, to an integrated washer-dryer with both washing and drying functions.

BACKGROUND

With the improvement of people's quality of life, the integrated washer-dryer has become one of indispensable household appliances in people's daily life. In recent years, the integrated washer-dryer with both washing and drying functions has been more and more favored by people.

Usually, the integrated washer-dryer includes a box body, an inner and outer drum assembly installed in the box body, and a drying air duct in communication with the inner and outer drum assembly, and a heat exchange device provided inside the drying air duct. When drying clothes, humid air in the inner and outer drum assembly will enter, through an air inlet of the drying air duct, into the heat exchange device for condensation and heating to form dry air with high temperature, and the dry air with high temperature will enter into the inner and outer drum assembly through an air outlet of the drying air duct and take away the moisture in the clothes to become humid air. Since the clothes will produce lint and other debris during the washing process, the humid air entering the drying air duct through the air inlet of the drying air duct will also carry a certain amount of debris which may easily block the heat exchange device, thereby reducing the drying efficiency.

Therefore, it has become a key research direction for designers with regard to how to prevent debris in clothes from entering the drying air duct so as to improve the drying efficiency of the integrated washer-dryer.

SUMMARY

The present application provides an integrated washer-dryer which, when in a drying process for clothes, can prevent debris in the clothes from entering the heat exchange device and blocking the heat exchange device, so as to improve the drying efficiency of the integrated washer-dryer.

The present application provides an integrated washer-dryer, including a box body, an inner and outer drum assembly installed in the box body, a drying air duct provided between the box body and the inner and outer drum assembly, and a heat exchange device provided in the drying air duct. An air inlet and an air outlet of the drying air duct are both in communication with the inner and outer drum assembly, the air inlet is configured with a first filter member, and a second filter member is provided between the first filter member and the heat exchange device. A water spray nozzle is provided within the drying air duct, and the water spray nozzle is provided between the first filter member and the second filter member, and is used for washing off debris trapped on the first filter member.

In a preferred embodiment of the integrated washer-dryer, a side wall of the drying air duct is provided with a first opening, the box body is provided with a second opening adaptable to the first opening, and the second filter member is pluggably installed in the first opening and the second opening.

In a preferred embodiment of the integrated washer-dryer, the second opening of the box body is located on a side surface or a top surface of the box body.

In a preferred embodiment of the integrated washer-dryer, the second filter member is provided with a handle assembly including a clasp and an end cover; the clasp is exposed outside the box body, and the end cover is located on the inside of the clasp and obscures the first opening of the drying air duct.

In a preferred embodiment of the integrated washer-dryer, the end cover is provided with a sealing rubber ring for sealing the first opening.

In a preferred embodiment of the integrated washer-dryer, the first filter member includes a metal filter screen.

In a preferred embodiment of the integrated washer-dryer, a surface of the metal filter screen is provided with an anti-adhesive coating.

In a preferred embodiment of the integrated washer-dryer, the metal filter screen has a mesh count of no more than 50 meshes.

In a preferred embodiment of the integrated washer-dryer, the second filter member includes a nylon filter screen.

In a preferred embodiment of the integrated washer-dryer, the nylon filter screen has a mesh count of no less than 140 meshes.

In a preferred embodiment of the integrated washer-dryer, the second filter member further includes a reticulated foam, where the reticulated foam is provided on a side of the nylon filter screen facing the heat exchange device.

Those skilled in the art can understand that the integrated washer-dryer of the present application includes a box body, an inner and outer drum assembly installed in the box body, a drying air duct provided between the box body and the inner and outer drum assembly, and a heat exchange device provided in the drying air duct. Through the arrangement that an air inlet and an air outlet of the drying air duct are both in communication with the inner and outer drum assembly, the humid air in the inner and outer drum assembly can enter, through the air inlet of the drying air duct, into the heat exchange device for condensation and heating to obtain dry air with high temperature, and the dry air with high temperature can enter into the inner and outer drum assembly through the air outlet of the drying air duct and absorb the moisture in the clothes to become humid air, and the humid air continues to enter into the heat exchange device from the air inlet of the drying air duct; with such a cyclical repeat, the drying of the clothes is achieved.

By configuring a first filter member in the air inlet of the drying air duct and providing a second filter member between the first filter member and the heat exchange device, the humid air is subject to double filtration from the first filter member and the second filter member before entering the heat exchange device, so as to filter the lint and other debris carried in the humid air; therefore, the lint can be prevented from entering the heat exchange device along with the humid air and blocking the heat exchange device, which is conducive to improving the drying efficiency of the integrated washer-dryer and reducing the energy consumption of the integrated washer-dryer.

At the same time, by providing a water spray nozzle within the drying air duct and enabling the water spray nozzle located between the first filter member and the second filter member to spray water against the first filter member, it is possible to wash off the debris trapped on the first filter member so that the trapped debris is prevented from blocking the first filter member. In this way, there is no need for users to manually clean the first filter member, which simplifies the cleaning process of the first filter member; moreover, due to the existence of the first filter member, debris such as lint can be first trapped on the first filter member, which reduces the amount of debris that needs to be filtered by the second filter member so that the frequency for the users to clean the second filter member can be reduced, thereby improving the experience of the users.

BRIEF DESCRIPTION OF DRAWINGS

In order to illustrate the technical solutions of embodiments of the present application more clearly, the drawings that need to be used in the embodiments will be briefly introduced hereunder. It should be understood that the following drawings only show certain embodiments of the present application, and therefore should not be regarded as a limitation of the scope. For those ordinarily skilled in the art, other relevant drawings also can be obtained according to these drawings without any creative work.

DESCRIPTION OF EMBODIMENTS

Figure 1:
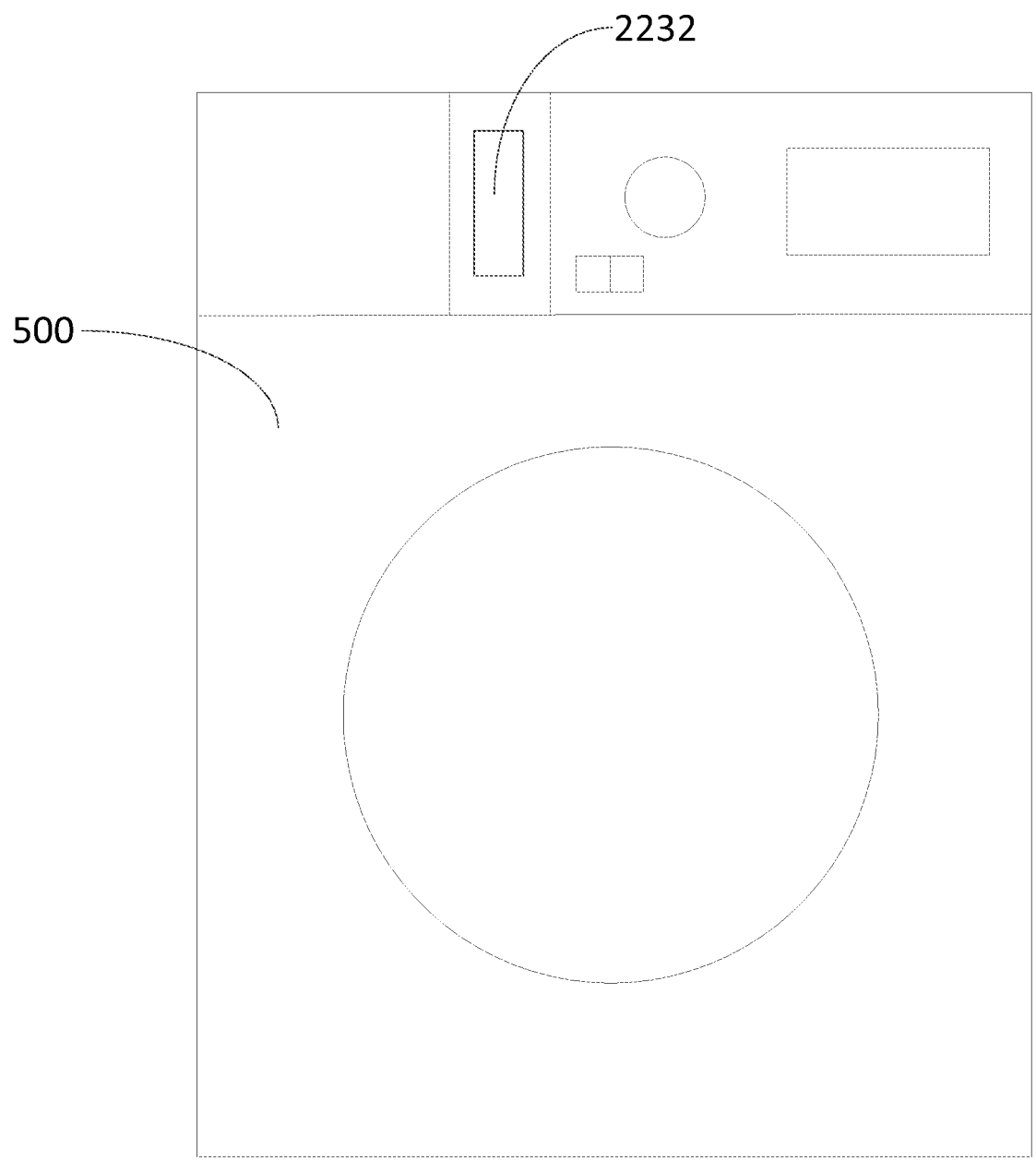
FIG. 1 is a schematic structural diagram of the integrated washer-dryer of the present application.

The integrated washer-dryer with both washing and drying functions usually includes a box body, an inner and outer drum assembly installed in the box body, a drying air duct provided between the box body and the inner and outer drum assembly, and a heat exchange device provided in the drying air duct. The heat exchange device includes an evaporator and a condenser. Firstly, the humid air inside the inner and outer drum assembly enters into the evaporator through an air inlet of the drying air duct to obtain dry air by condensating and separating vapor in the humid air, and then the dry air enters into the condenser to obtain the dry air with high temperature by heating, and then the dry air with high temperature enters into the inner and outer drum assembly and absorbs the moisture in the clothes to become humid air.

In a drying process of the integrated washer-dryer for clothes, lint and other debris in the clothes will enter the evaporator and the condenser in the drying air duct along with the flowing air, resulting in the blockage of the evaporator and the condenser and thereby affecting the drying efficiency of the integrated washer-dryer. In related technologies, a filtration structure will be set in the upstream of the drying air duct of the evaporator and the condenser, but for this kind of filtration structure, on the one hand, there is a poor filtration effect, resulting in the accumulation of debris in the evaporator and the condenser, thereby affecting the drying efficiency of the integrated washer-dryer; on the other hand, the amount of debris that needs to be filtered is relatively large, resulting in users needing to frequently disassemble and clean the filter structure, thereby reducing the experience of the users.

In order to solve the above technical problems, the embodiments of the present application provide an integrated washer-dryer. By providing a first filter member and a second filter member for the integrated washer-dryer, the humid air is subject to double filtration from the first filter member and the second filter member before entering the heat exchange device, so that a filtration effect to lint and other debris can be improved; thereby the debris is prevented from entering the heat exchange device along with the humid air and blocking the heat exchange device, which is conducive to improving the drying efficiency of the integrated washer-dryer and reducing the energy consumption of the integrated washer-dryer.

At the same time, through the water spray nozzle provided between the first filter member and the second filter member, it is possible to wash the first filter member so as to clean up the debris attached to the first filter member, thus simplifying the cleaning process of the first filter member; moreover, due to existence of the first filter member, debris can be filtered on the first filter member firstly, reducing the amount of debris that the second filter member needs to filter, thereby reducing the frequency for the users to clean the second filter member, which is conducive to improving the experience of the users.

In order to make the objective, technical solutions and advantages of the embodiments of the present application clearer, the technical solutions in the embodiments of the present application will be described clearly and comprehensively in combination with the drawings in the embodiments of the present application. Obviously, the described examples are part of the examples of the present application, not all examples. Based on the examples of the present application, all other examples obtained by those ordinarily skilled in the field without creative work fall within the scope of the protection of the present application.

Figure 2:
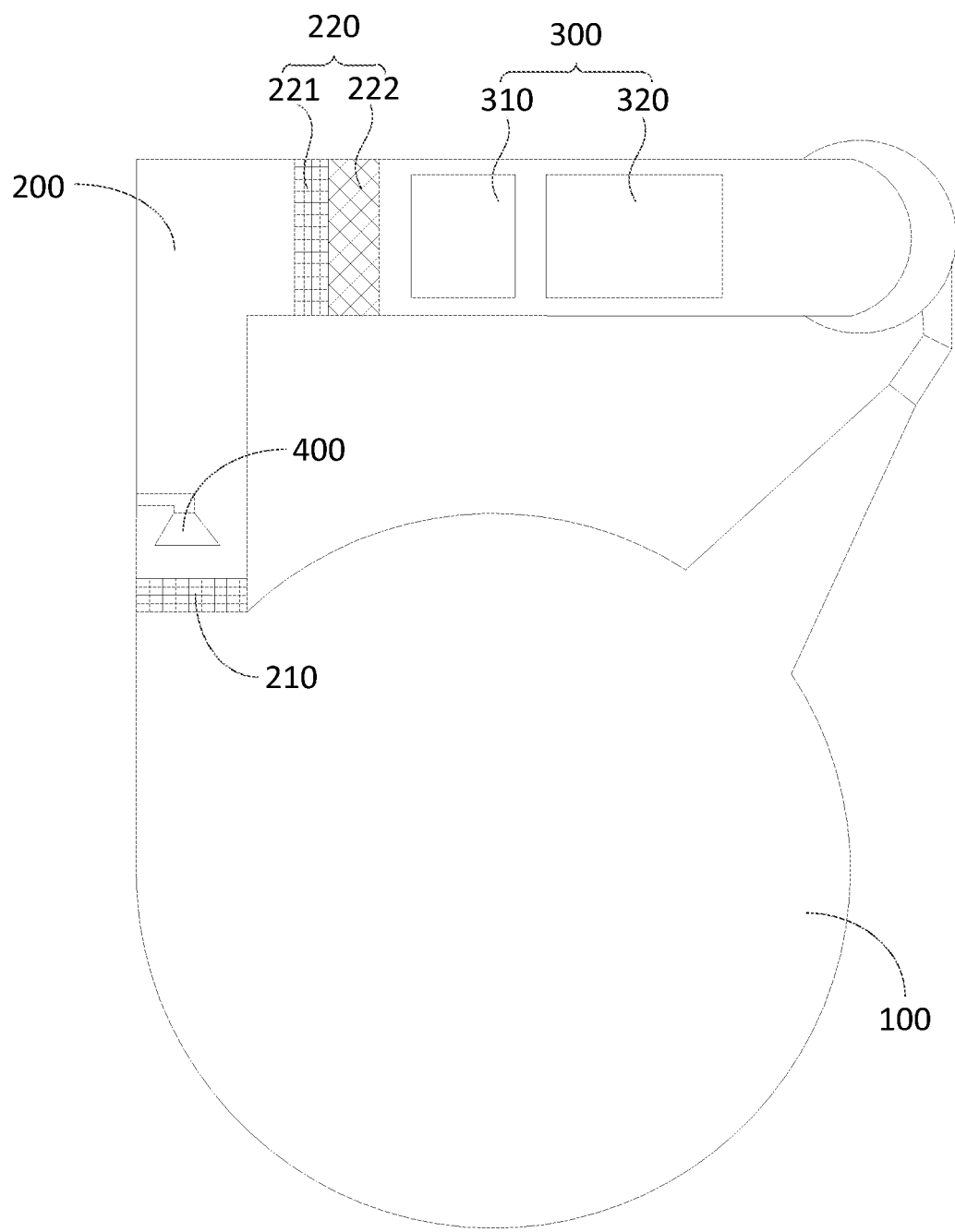
FIG. 2 is a schematic structural diagram showing the inner and outer drum assembly, the drying air duct, the heat exchange device and others in the integrated washer-dryer of the present application.
Figure 3:
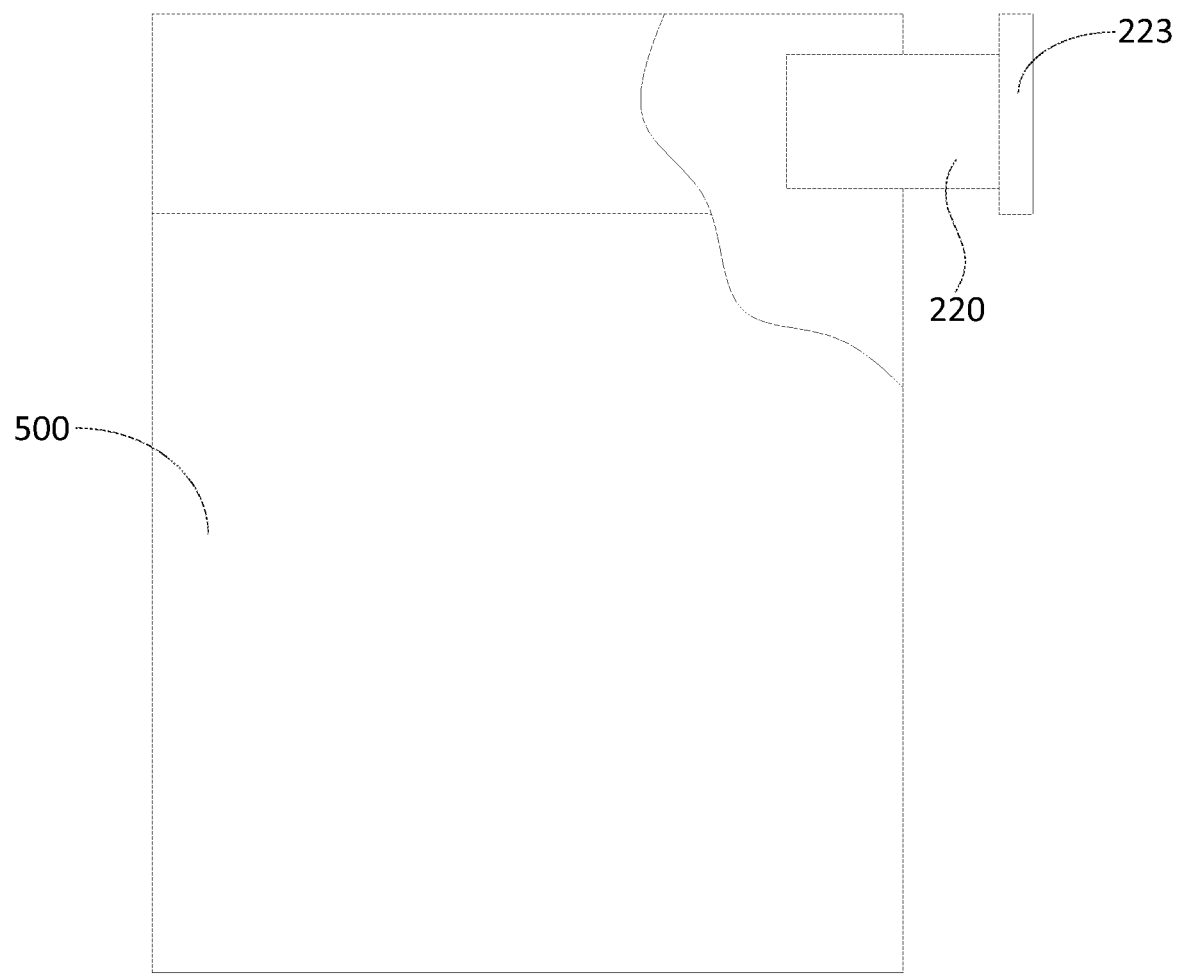
FIG. 3 is a partial sectional view of the second filter member in the integrated washer-dryer of the present application when the second filter member is pulled out.
Figure 4:
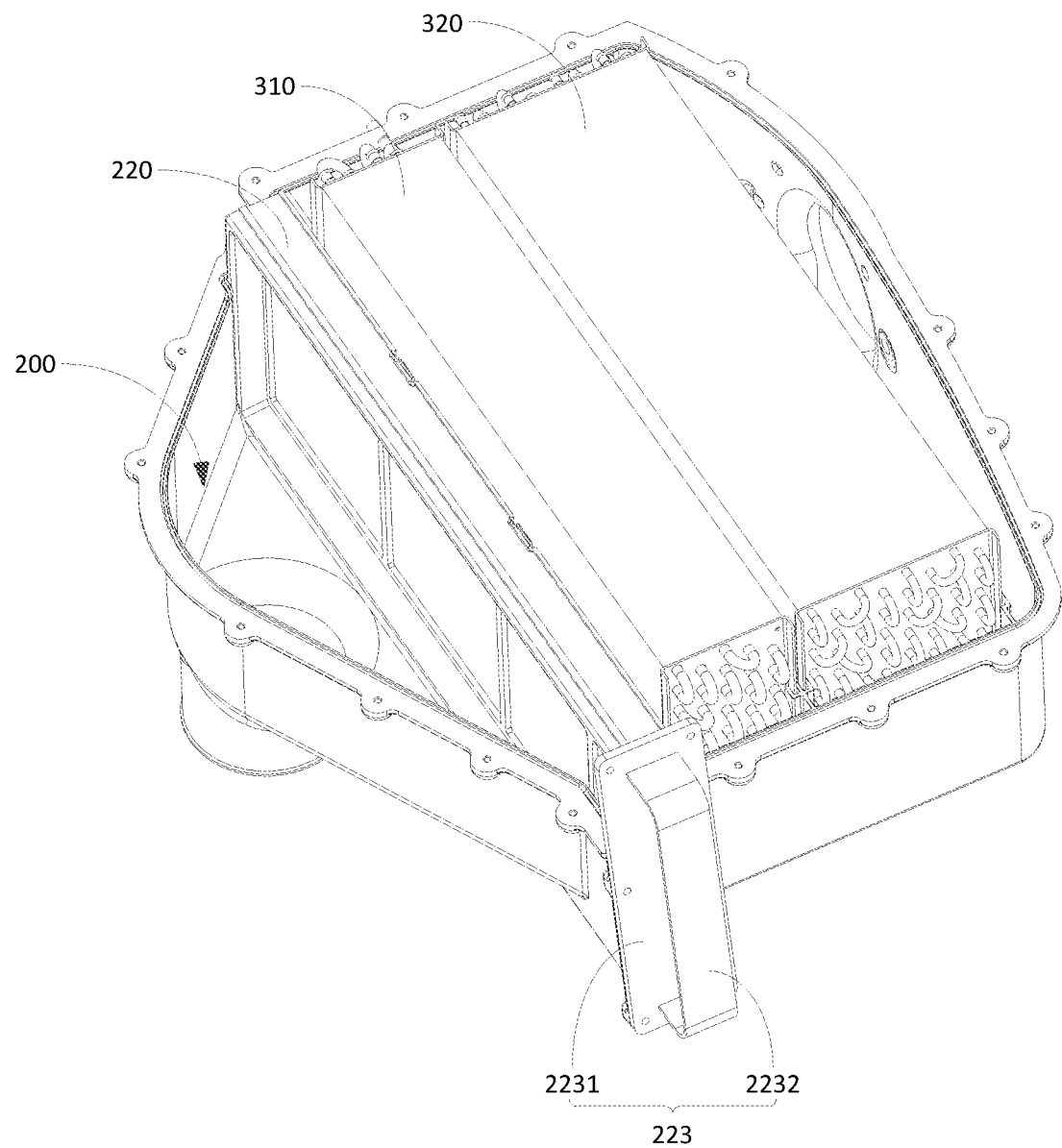
FIG. 4 is a schematic structural diagram showing that the second filter member is inserted in the drying air duct in the integrated washer-dryer of the present application.
Figure 5:
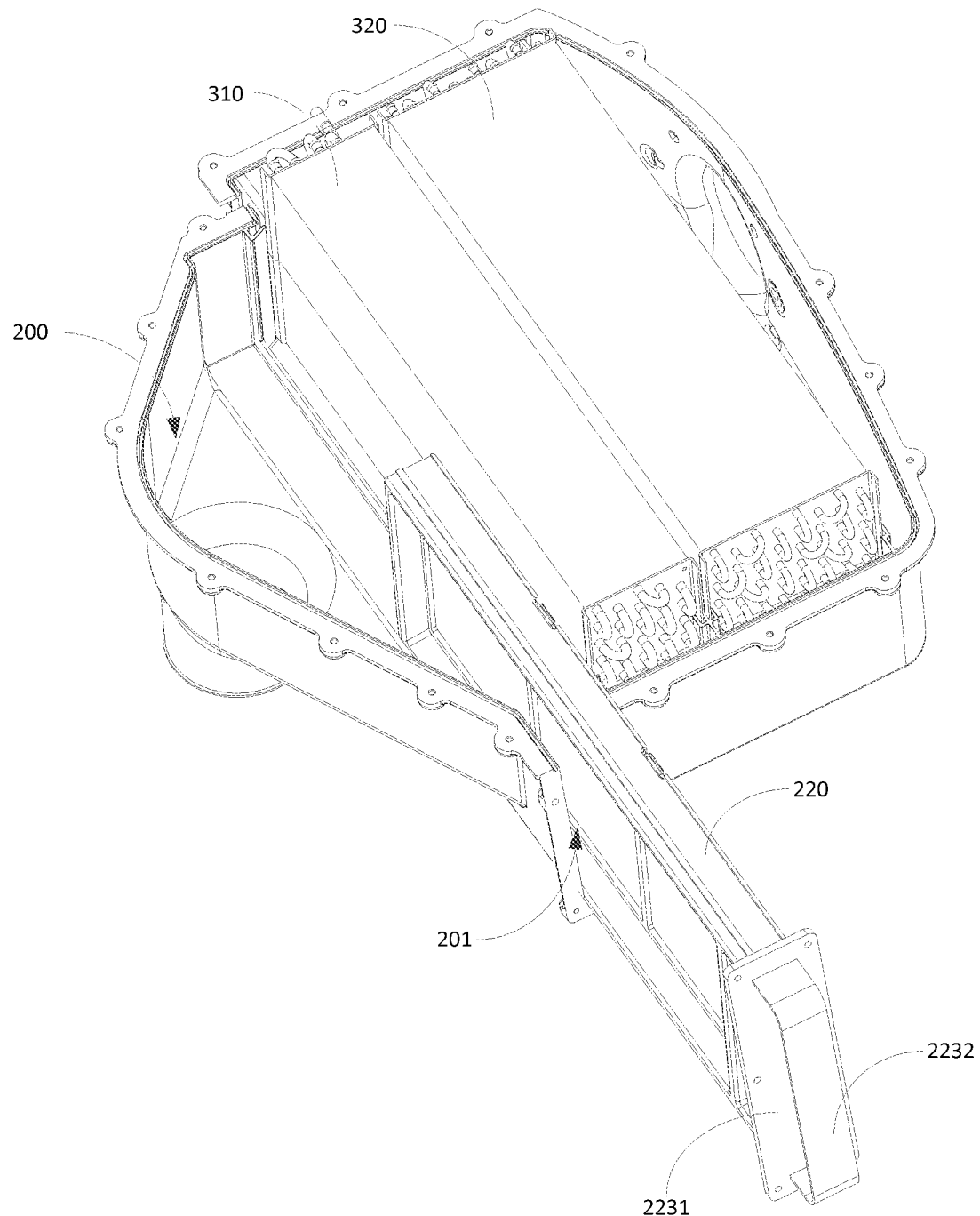
FIG. 5 is a schematic structural diagram showing that the second filter member is partially pulled out of the drying air duct in the integrated washer-dryer of the present application.

FIG. 1 is a schematic structural diagram of the integrated washer-dryer of the present application; FIG. 2 is a schematic structural diagram showing the inner and outer drum assembly, the drying air duct, the heat exchange device and others in the integrated washer-dryer of the present application; FIG. 3 is a partial sectional view of the second filter member in the integrated washer-dryer of the present application when the second filter member is pulled out; FIG. 4 is a schematic structural diagram showing that the second filter member is inserted in the drying air duct in the integrated washer-dryer of the present application; FIG. 5 is a schematic structural diagram showing that the second filter member is partially pulled out of the drying air duct in the integrated washer-dryer of the present application.

Referring to FIG. 1-FIG. 5, the present embodiment provides an integrated washer-dryer, which includes a box body 500, an inner and outer drum assembly 100 installed in the box body 500, a drying air duct 200 provided between the box body 500 and the inner and outer drum assembly 100, and a heat exchange device 300 provided in the drying air duct 200.

The inner and outer drum assembly 100 includes an outer drum installed in the box body 500 and a rotatable inner drum provided in the outer drum, and the articles to be washed or dried are placed in the inner drum for washing or drying.

The heat exchange device includes an evaporator 310 and a condenser 320. According to the flow direction of air in the drying air duct 200, the evaporator 310 is provided upstream of the condenser 320. The evaporator 310 is used for condensing and separating the moisture in the humid air to obtain dry air; the condenser 320 is used for heating the dry air to obtain dry air with high temperature; the dry air with high temperature can enter into the inner and outer drum assembly 100 and absorb the moisture in the clothes, so as to achieve the purpose of drying clothes.

The air inlet and the air outlet of the drying air duct 200 are both in communication with the inner and outer drum assembly 100, the air inlet is configured with a first filter member 210, and a second filter member 220 is provided between the first filter member 210 and the heat exchange device 300.

As an example, the second filter member 220 may be provided close to the inlet end of the evaporator 310 so that the humid air is filtered before entering the evaporator 310, to prevent debris from entering into the evaporator 310 and the condenser 320 located downstream of the evaporator 310 along with the humid air. Therefore, the debris can be prevented from blocking the evaporator 310 or the condenser 320, which is conducive to both improving the drying efficiency of the integrated washer-dryer and reducing the energy consumption of the integrated washer-dryer. Of course, the second filter member 220 can also be provided at any position between the first filter member 210 and the heat exchange device 300 according to the actual need, as long as it does not affect the installation of the water spray nozzle 400 and can filter the humid air entering the heat exchange device 300, which will not be repeated here.

A water spray nozzle 400 is provided within the drying air duct, and the water spray nozzle 400 is provided between the first filter member 210 and the second filter member 220, and the water spray nozzle 400 can be used for washing off debris trapped on the first filter member 210. Specifically, the water spray nozzle 400 can be a stream of water directed from the inlet pipe of the integrated washer-dryer so that the first filter member 210 can be washed.

As an example, the water spray nozzle 400 may be provided close to the first filter member 210 so that the water sprayed from the water spray nozzle 400 may directly impinge against the first filter member 210, thereby cleaning the first filter member 210 better and washing away debris attached to the first filter member 210. Of course, the water spray nozzle 400 can also be provided at any position between the first filter member 210 and the second filter member 220 according to the actual need, as long as it can be guaranteed that the water flowing from the water spray nozzle 400 will enter into the inner and outer drum assembly 100 through the first filter member 210 to wash the first filter member 210, which will not be repeated here.

In a specific implementation, in a drying process of the integrated washer-dryer for clothes, the humid air in the inner and outer drum assembly 100 goes through double filtration from the first filter member 210 and the second filter member 220, after that, the humid air firstly enters into the evaporator 310 to obtain dry air through condensation and separation of the vapor in the humid air, and the dry air enters into the condenser 320 to obtain dry air with high temperature by heating, and the dry air with high temperature can enter into the inner and outer drum assembly 100 through the air outlet of the drying air duct 200 and absorb the moisture in the clothes to become humid air, and the humid air continues to goes through the double filtration from the first filter member 210 and the second filter member 220, and then enters into the evaporator 310 and the condenser 320 in turn; with such a cyclic repeat, the drying of the clothes is achieved.

When it is necessary to clean up the lint and other debris attached to the first filter member 210, it only needs to open the water spray nozzle 400 of the integrated washer-dryer. The water sprayed from the water spray nozzle 400 can impinge against the first filter member 210 to wash off the debris attached to the first filter member 210. The debris washed off can be discharged from the exhausting pipe of the integrated washer-dryer along with the water flow to complete the cleaning of the first filter member 210.

Those skilled in the art can understand that the integrated washer-dryer of the present embodiment includes the box body 500, the inner and outer drum assembly 100 installed in the box body 500, the drying air duct 200 provided between the box body 500 and the inner and outer drum assembly 100, and the heat exchange device 300 provided in the drying air duct 200. Through the arrangement that the air inlet and the air outlet of the drying air duct 200 are both connected with the inner and outer drum assembly 100, the humid air in the inner and outer drum assembly 100 can enter, through the air inlet of the drying air duct 200, into the heat exchange device 300 for condensation and heating to obtain dry air with high temperature, and the dry air with high temperature can enter into the inner and outer drum assembly 100 through the air outlet of the drying air duct 200 and absorb the moisture in the clothes to become humid air, and the humid air continues to enter into the heat exchange device 300 from the air inlet of the drying air duct 200; with such a cyclical repeat, the drying of the clothes is achieved.

By configuring the first filter member 210 in the air inlet of the drying air duct 200 and providing the second filter member 220 between the first filter member 210 and the heat exchange device 300, the humid air is subject to double filtration from the first filter member 210 and the second filter member 220 before entering the heat exchange device 300, so as to filter the lint and other debris carried in the humid air; therefore, the lint can be prevented from entering the heat exchange device 300 along with the humid air and blocking the heat exchange device 300, which is conducive to improving the drying efficiency of the integrated washer-dryer and reducing the energy consumption of the integrated washer-dryer.

At the same time, by providing the water spray nozzle 400 within the drying air duct 200 and enabling the water spray nozzle 400 to be located between the first filter member 210 and the second filter member 220, the water spray nozzle 400 can be used to clean off the debris trapped on the first filter member 210 so that the trapped debris is prevented from blocking the first filter member 210. In this way, there is no need to manually clean the first filter member 210, which simplifies the cleaning process of the first filter member 210; moreover, due to the existence of the first filter member 210, debris such as lint can be first trapped on the first filter member 210, which reduces the amount of debris that needs to be filtered by the second filter member 220 so that the frequency for the users to clean the second filter member 220 can be reduced, thereby improving the experience of the users.

Referring to FIG. 3-FIG. 5, as an example, a portion of the drying air duct 200 used for providing the heat exchange device 300 can be expanded outward to form a cavity with a relatively large cross section. The evaporator 310, the condenser 320 and the second filter member 220 may all be provided in the cavity of the drying air duct 200, and two ends of the cavity of the drying air duct 200 are respectively communicated with the pipe line of the drying air duct 200 to form a complete drying air duct 200.

A side wall of the drying air duct 200 may be provided with a first opening 201, the box body 500 is provided with a second opening adaptable to the first opening 201, and the second filter member 220 is pluggably installed in the first opening 201 and the second opening.

In a specific implementation, when the second filter member 220 needs to be cleaned, the second filter member 220 can be cleaned upon being pulled out from the first opening 201 and the second opening, and then the cleaned second filter member 220 is inserted back into the integrated washer-dryer from the first opening 201 and the second opening, so as to facilitate the disassembly and assembly, cleaning and replacement of the second filter member 220. On the one hand, it helps to keep the drying efficiency of the integrated washer-dryer in a good state at all times, thus reducing the energy consumption of the integrated washer-dryer; on the other hand, it helps to improve the experience of users.

Further, the second opening of the box body 500 may be provided on a side surface or a top surface of the box body 500 according to the position of the first opening 201.

In a specific implementation, when the first opening 201 of the drying air duct 200 is provided on the side of the drying air duct 200 facing the side surface of the box body 500, the second opening can be provided on the side surface of the box body 500, and then the second filter member 220 can be inserted and pulled from the side surface of the box body, where the side surface of the box body 500 includes a front panel, a rear panel, and a side panel located between the front panel and the rear panel of the integrated washer-dryer; alternatively, when the first opening 201 of the drying air duct 200 is provided on the side of the drying air duct 200 facing the top surface of the box body 500, the second opening may be provided on the top surface of the box body 500, and then the second filter member 220 can be inserted and pulled from the top surface of the box body.

Referring to FIG. 4 and FIG. 5, further, the second filter member 220 is provided with a handle assembly 223 which includes a clasp 2232 and an end cover 2231; where the clasp 2232 is exposed outside the box body 500, and the end cover 2231 is located on the inside of the clasp 2232 and obscures the first opening 201 of the drying air duct 200.

In a specific implementation, the user can hold the clasp 2232 to pull the second filter member 220 out of the integrated washer-dryer so as to clean the second filter member 220, thereby enabling the disassembly and assembly of the second filter member 220 to be convenient and quick. The end cover 2231 can cover the first opening 201 of the drying air duct 200 after the second filter member 220 is installed back into the integrated washer-dryer, so as to avoid impacts on the drying efficiency due to the leakage of dry air with high temperature in the drying air duct 200 from the first opening 201 during the drying process.

Further, the end cover 2231 can be provided with a sealing rubber ring for sealing the first opening 201, so that it is possible to further avoid the leakage of dry air with high temperature in the drying air duct 200 from the first opening 201 during the drying process, thereby ensuring the drying efficiency of the integrated washer-dryer and reducing the energy consumption of the integrated washer-dryer.

In one possible implementation, the first filter member 210 may be a metal filter screen, for example, a stainless steel filter screen, an aluminum foil filter screen or the like. Setting the first filter member 210 as a metal filter screen helps to ensure that the first filter member 210 located at the air inlet of the drying air duct 200 has a relatively stable structure. The structure is not only un-deformable under the impact of the clothes in the inner and outer drum assembly 100, but also can withstand the flow impact from the water spray nozzle 400.

In other implementations, the first filter member 210 may also be a filter screen made of brass wires, a filter screen made of nickel wires, or a filter screen made of other metal material; or, the first filter member 210 may also be a filter screen of nylon material or other non-metallic material, as long as the requirements of the present embodiment for the first filter member 210 can be met, which will not be repeated here.

Further, in order to wash off the lint and other debris attached to the metal filter screen without residues when the water flowing out of the water spray nozzle 400 passes through the metal filter screen, an anti-adhesive coating can be provided on the surface of the metal filter screen.

In one implementation, the anti-adhesive coating may be a polymer coated on the surface of the metal filter screen, such as Tetranyl, or a nano-coating on the surface of the metal filter screen, or other coating with anti-adhesive effects, so that it can be very easy to wash away the debris such as lint on the metal filter screen when the water flowing out of the water spray nozzle 400 passes through the metal filter screen, thus the debris such as lint goes with the water flow to realize the thorough cleaning of the metal filter screen.

In other implementations, the anti-adhesive coating can also be formed on the surface of the metal filter screen by electroplating, so that lint on the metal filter screen can be easily washed away when the water flowing out of the water spray nozzle passes through the metal filter screen, to achieve the thorough cleaning of the metal filter screen.

Specifically, the metal filter screen can be set in a size below 50 meshes. For example, according to the actual need, the metal filter screen can be set in a size of 50 meshes, 45 meshes, 40 meshes, 35 meshes or 30 meshes or the like. On the one hand, the metal filter screen is enabled to reduce the influence on the flow rate of wet air while filtering the lint in the humid air, so as to improve the drying efficiency of the integrated washer-dryer. On the other hand, the water-flow can pass through the metal filter screen more smoothly when the water spray nozzle 400 is washing the metal filter screen, so as to better wash the metal filter screen, and at the same time take away lint and other debris attached to the metal filter screen.

In other implementations, the metal filter screen can also be set in a size greater than 50 meshes according to the actual needs. For example, the metal filter screen can be set in a size of 55 meshes, 60 meshes or 65 meshes or the like, as long as the requirements of the embodiment can be met, which will not be repeated here.

It is understandable that the first filter member 210 of the present embodiment may be detachably mounted at the air inlet of the drying air duct 200, and the same integrated washer-dryer may be equipped with a plurality of first filter members 210 of different sizes, thereby enabling the user to replace the first filter members 210 of different sizes according to actual needs so as to match articles of different materials that are to be washed and placed in the inner and outer drum assembly 100.

Referring to FIG. 2, in a feasible implementation, the second filter member 220 may include a nylon filter screen 221. The nylon filter screen 221 is mainly made of polypropylene as raw material. The nylon filter screen 221 is not only acid and alkali resistant, but also corrosion resistant; moreover, the nylon filter screen 221 has a low resistance, and can be repeatedly cleaned, with its filtration efficiency being immune to cleaning, so that the nylon filter screen 221 is highly economical; in addition, the impact resistance of the nylon filter screen 221 is also relatively strong, which is conducive to ensuring the stability of the second filter member 220, in order to obtain a relatively good filtration effect.

In other implementations, the second filter member 220 may also include a nylon filter screen; or the second filter member 220 may also include a non-metallic filter screen of other material as long as the requirements of the present embodiment for the second filter member 220 can be met, which will not be repeated here.

As an example, the nylon filter screen 221 may be set in a size more than 140 meshes. For example, according to the actual needs, the nylon filter screen 221 can be set in a size of 140 meshes, 150 meshes, 160 meshes, 170 meshes or 200 meshes or the like. Therefore, the nylon filter screen 221 can filter out the relatively small debris in the humid air, so as to prevent the debris from entering the heat exchange device 300 and blocking the heat exchange device 300, thereby improving the drying efficiency of the integrated washer-dryer, and reducing the energy consumption of the integrated washer-dryer.

In other implementations, the nylon filter screen 221 can also be set in a size of no less than 140 meshes according to the actual needs. For example, the nylon filter screen 221 can be set in a size of 135 meshes, 130 meshes, 125 meshes or 120 meshes, or the like, as long as the requirements of the embodiment can be met, which will not be repeated here.

Referring to FIG. 2, the second filter member 220 may also include a reticulated foam 222, and the reticulated foam 222 may be provided on a side of the nylon filter screen 221 facing the heat exchange device 300. As an example, the reticulated foam 222 may be attached to the side of the nylon filter screen 221 facing the heat exchange device 300; or there may be a gap between the reticulated foam 222 and the nylon filter screen 221.

In a specific implementation, firstly, the humid air enters the drying air duct 200 following filtration by the first filter member 210, and then enters the heat exchange device 300 following filtration by the nylon filter screen 221 and the reticulated foam 222 of the second filter member 220, so that lint and other debris carried in the humid air can be filtered more thoroughly, so as to prevent the humid air from bringing the lint and other debris into the heat exchange device 300, which is beneficial to improve the drying efficiency of the integrated washer-dryer and reduce the energy consumption of the integrated washer-dryer.

Finally, it should be stated that the above embodiments are used to illustrate the technical solution of the present application, rather than to restrict it; although the present application is explained in detail with reference to the above-mentioned embodiments, those ordinarily skilled in the art should understand that they can still modify the technical solution recorded in the above-mentioned embodiments, or equivalently replace some or all of the technical features thereof. Such modifications or replacements shall not make the essence of the corresponding technical solution depart from the scope of the technical solution of each embodiment of the present application.

What is claimed is:

1. An integrated washer-dryer, comprising a box body, an inner and outer drum assembly installed in the box body, a drying air duct provided between the box body and the inner and outer drum assembly, and a heat exchange device provided in the drying air duct;
   wherein an air inlet and an air outlet of the drying air duct are both in communication with the inner and outer drum assembly, the air inlet is configured with a first filter member, and a second filter member is provided between the first filter member and the heat exchange device;
   a water spray nozzle is provided within the drying air duct, and the water spray nozzle is provided between the first filter member and the second filter member, and is used for washing off debris trapped on the first filter member.

2. The integrated washer-dryer according to claim 1, wherein a side wall of the drying air duct is provided with a first opening, the box body is provided with a second opening adaptable to the first opening, and the second filter member is pluggably installed in the first opening and the second opening.

3. The integrated washer-dryer according to claim 2, wherein the second opening of the box body is located on a side surface or a top surface of the box body.

4. The integrated washer-dryer according to claim 2, wherein the second filter member is provided with a handle assembly comprising a clasp and an end cover;
   the clasp is exposed outside the box body, and the end cover is located on the inside of the clasp and obscures the first opening of the drying air duct.

5. The integrated washer-dryer according to claim 4, wherein the end cover is provided with a sealing rubber ring for sealing the first opening.

6. The integrated washer-dryer according to claim 1, wherein the first filter member comprises a metal filter screen.

7. The integrated washer-dryer according to claim 2, wherein the first filter member comprises a metal filter screen.

8. The integrated washer-dryer according to claim 3, wherein the first filter member comprises a metal filter screen.

9. The integrated washer-dryer according to claim 4, wherein the first filter member comprises a metal filter screen.

10. The integrated washer-dryer according to claim 5, wherein the first filter member comprises a metal filter screen.

11. The integrated washer-dryer according to claim 6, wherein a surface of the metal filter screen is provided with an anti-adhesive coating; and/or
    the metal filter screen has a mesh count of no more than 50 meshes.

12. The integrated washer-dryer according to claim 7, wherein a surface of the metal filter screen is provided with an anti-adhesive coating; and/or
    the metal filter screen has a mesh count of no more than 50 meshes.

13. The integrated washer-dryer according to claim 8, wherein a surface of the metal filter screen is provided with an anti-adhesive coating; and/or
    the metal filter screen has a mesh count of no more than 50 meshes.

14. The integrated washer-dryer according to claim 1, wherein the second filter member comprises a nylon filter screen.

15. The integrated washer-dryer according to claim 2, wherein the second filter member comprises a nylon filter screen.

16. The integrated washer-dryer according to claim 3, wherein the second filter member comprises a nylon filter screen.

17. The integrated washer-dryer according to claim 4, wherein the second filter member comprises a nylon filter screen.

18. The integrated washer-dryer according to claim 5, wherein the second filter member comprises a nylon filter screen.

19. The integrated washer-dryer according to claim 14, wherein the nylon filter screen has a mesh count of no less than 140 meshes.

20. The integrated washer-dryer according to claim 14, wherein the second filter member further comprises a reticulated foam, and the reticulated foam is provided on a side of the nylon filter screen facing the heat exchange device.

* * * * *